United States Patent [19]
Nakajima et al.

[11] Patent Number: 6,160,550
[45] Date of Patent: *Dec. 12, 2000

[54] SHELL EXTENSIONS FOR AN OPERATING SYSTEM

[75] Inventors: Satoshi Nakajima; George H. Pitt, III, both of Redmond; Joseph D. Belfiore, Seattle; Christopher J. Guzak, Kirkland; Chee H. Chew, Redmond, all of Wash.

[73] Assignee: Microsoft Corporation, Redmond, Wash.

[*] Notice: This patent is subject to a terminal disclaimer.

[21] Appl. No.: 09/392,344

[22] Filed: Sep. 8, 1999

Related U.S. Application Data

[62] Division of application No. 09/179,240, Oct. 26, 1998, Pat. No. 5,831,606, which is a continuation of application No. 08/355,410, Dec. 13, 1994, Pat. No. 6,008,806.

[51] Int. Cl.⁷ ..................................................... G06F 13/00
[52] U.S. Cl. ........................... 345/335; 709/303; 709/304
[58] Field of Search ............................ 345/335; 709/304, 709/305, 306, 201, 229; 707/103; 364/DIG. 1, 280, 281.3, 281.7, 282.1

[56] References Cited

U.S. PATENT DOCUMENTS

| | | |
|---|---|---|
| 5,504,892 | 4/1996 | Atsatt et al. . |
| 5,561,799 | 10/1996 | Khalidi et al. . |
| 5,572,709 | 11/1996 | Fowler et al. . |
| 5,581,760 | 12/1996 | Atkinson et al. . |
| 5,598,524 | 1/1997 | Johnston, Jr. et al. . |
| 5,615,400 | 3/1997 | Cowsar et al. .......................... 709/305 |

*Primary Examiner*—Ba Huynh
*Attorney, Agent, or Firm*—Christensen O'Connor Johnson Kindness PLLC

[57] ABSTRACT

An operating system provides extensions through which application developers may extend the capabilities of a shell of the operating system. For example, application developers may add menu items to context menus for objects that are visible within an integrated system name space. In addition, developers may add property sheet pages for such objects. Application developers also have the option of providing per-instance icons for each instance of an object. Application developers may provide data object extension handlers for customizing data sources on a per-object class basis and may provide drop target extension handlers on a per-object class basis to customize drop target behavior. Developers may additionally provide copy-hook handlers to regulate file system operations on objects. Developers may also extend the functionality provided by the shell of the operating system by adding their own custom name spaces to the integrated system name space. The mechanism provided by the operating system to add such a name space is polymorphic and transparent to users.

2 Claims, 10 Drawing Sheets

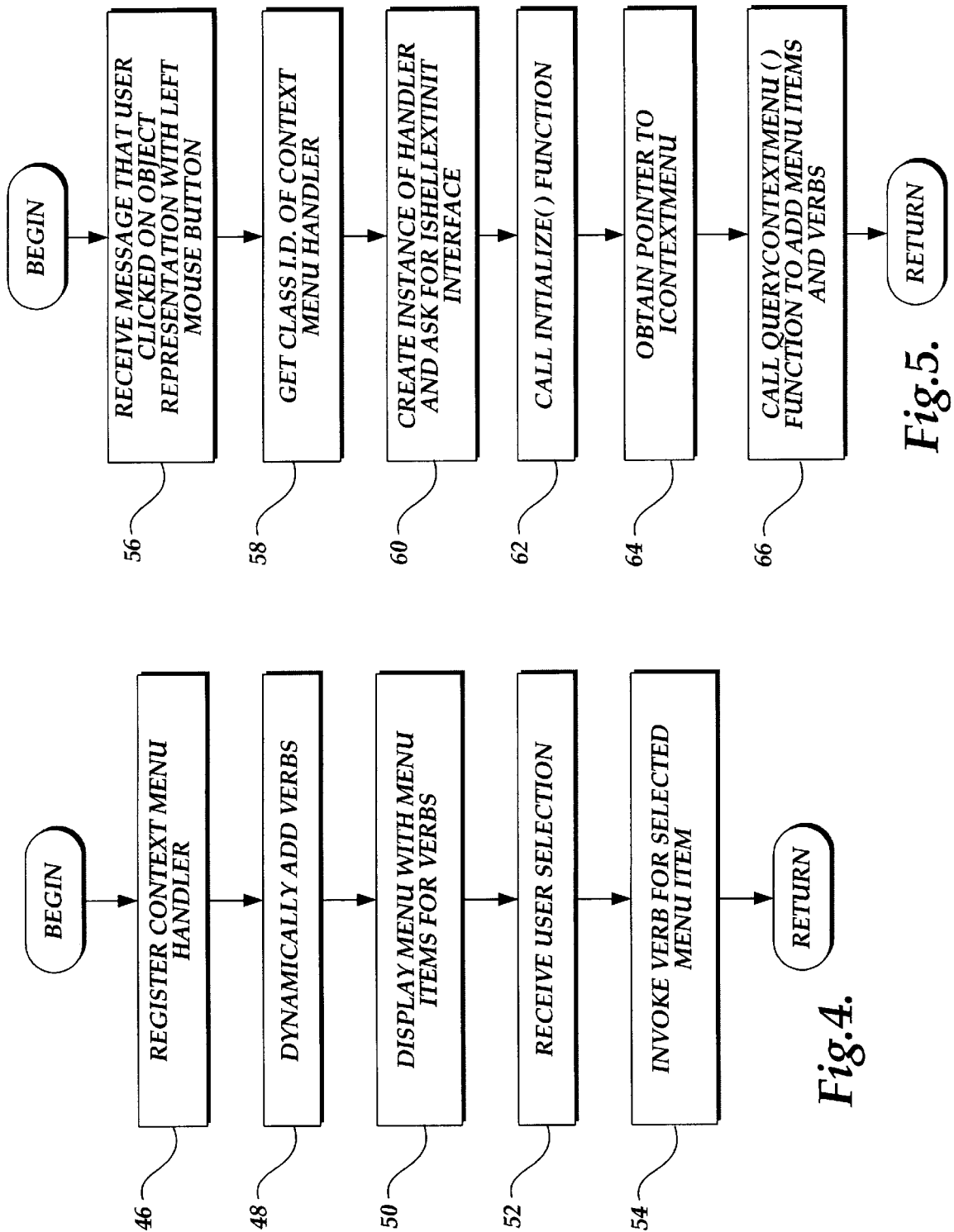

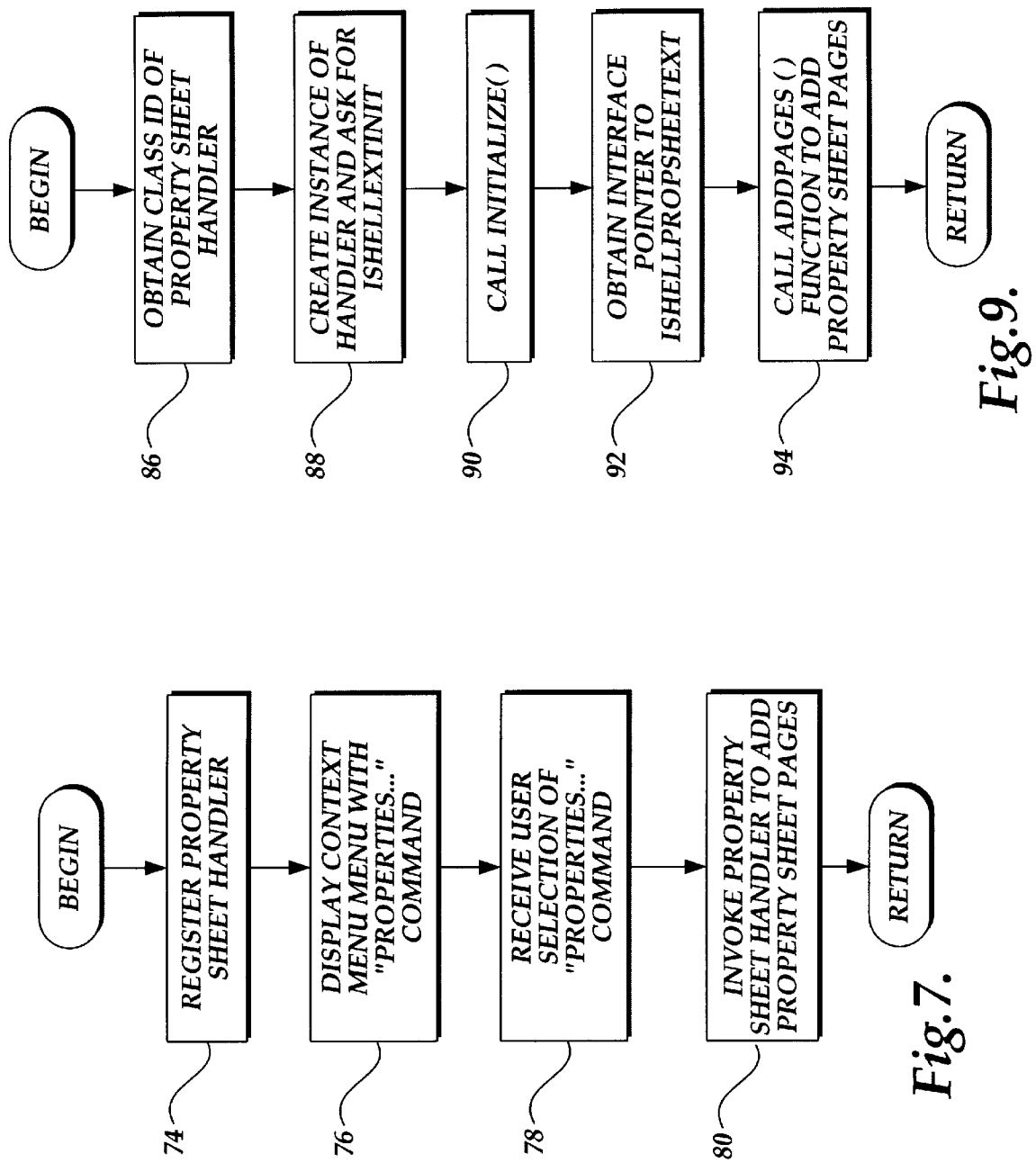

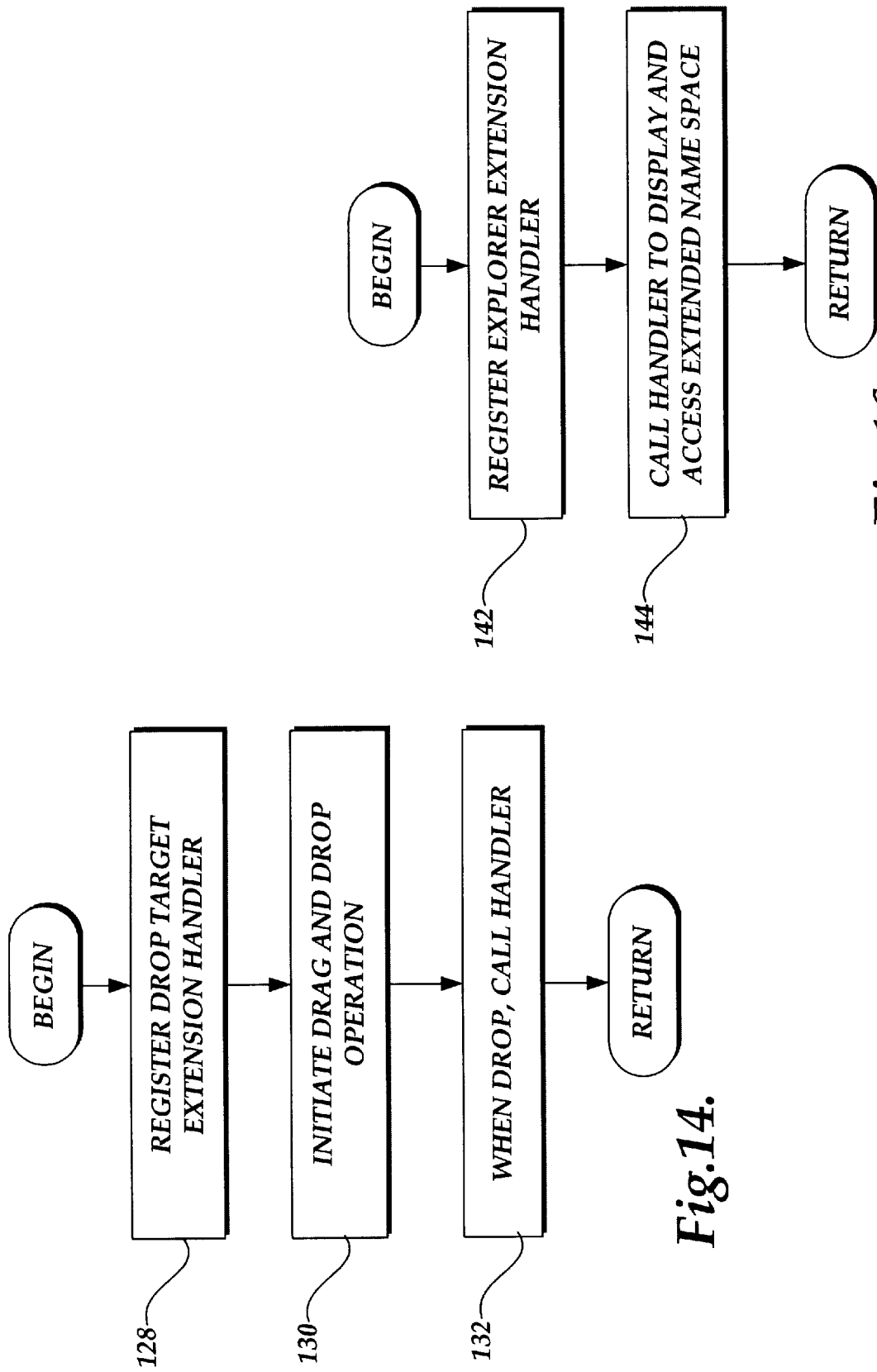

SHELL EXTENSIONS FOR AN OPERATING SYSTEM

CROSS-REFERENCE TO RELATED INVENTIONS

This application is a divisional application of U.S. patent application Ser. No. 09/179,240 filed on Oct. 26, 1998, now U.S. Pat. No. 5,831,606, which is a continuation of U.S. Ser. No. 08/355,410 filed on Dec. 13, 1994, now U.S. Pat. No. 6,008,806.

FIELD OF THE INVENTION

The present invention relates generally to data processing systems and, more particularly, to shell extensions for an operating system.

BACKGROUND OF THE INVENTION

Conventional operating systems include shells that provide user interfaces. Unfortunately, such shells are often limited in their capabilities and in the flexibility of options that they provide to an applications developer. For example, such conventional operating systems often provide shells that define context menus for each file system object. The list of menu items and associated operations provided by the shells for the context menus are often limited. Moreover, the menu items cannot be changed by applications.

Conventional shells are often additionally limited in that they predefine property sheet pages for file system objects. The property sheet pages are user interface elements that display property values for the associated file system objects and typically allow a user to change some of the displayed property values. Each property sheet page is associated with a subset of related properties for the objects.

The shells of conventional operating systems are further limited in that they provide predefined icons only for file types or objects classes. These shells do not facilitate the use of per-instance icons that are associated with each instance of an object or file. The shells of the conventional operating systems are further limited in that they only provide access to objects in the file system name spaces and provide no easy mechanism for integrating additional name spaces into the system.

Conventional operating systems are also limited as to drag-and-drop operations. In particular, applications have no ability to customize the functionality of a drop based upon a file object type in conventional systems. Further, these conventional operating systems provide no ability to customize source objects in drag-and-drop operations.

SUMMARY OF THE INVENTION

The above-described difficulties encountered by shells of conventional operating systems are overcome by the present invention. In accordance with a first aspect of the present invention, a method is practiced in a data processing system that includes a video display and an object that has an associated context menu for specifying operations that may be performed relative to the object. The data processing system also includes an operating system with a shell that specifies predefined menu items in the context menu. In this method, a database of entries holding configuration information is provided within the data processing system. Menu items that are not predefined by the shell are registered in the database so that the menu items are included in the context menu. Each entry that is registered in this fashion includes an identification of code that is to be executed when the menu item of the object is selected by a user.

In accordance with a further aspect of the present invention, configuration information about a context menu handler is registered in database configuration information in a data processing system. A user makes a request and, in response to the request, the database is accessed to obtain configuration information about the context menu handler. The context menu handler is invoked to add menu items to a context menu of an object. A shell of an operating system provides at least one menu item for the context menu, but the context menu handler is used to add at least one additional menu item to the context menu for the object.

In accordance with an additional aspect of the present invention, a database of registration information is stored in a memory means in a data processing system. A representation of a per-instance icon for a file is also stored in the memory means. The representation of the per-instance icon is registered in the database of registration information along with an icon handler. The icon handler is used to find the representation of the per-instance icon. A request to display the per-instance icon is received and, in response, the database is accessed to locate the icon handler. The icon handler then provides the per-instance icon to the operating system, which displays the per-instance icon on the video display.

In accordance with another aspect of the present invention, a database of registration information is stored in a memory means of a data processing system. An object that has associated properties is provided within the data processing system. The data processing system includes a processing means that runs an operating system with a shell. The shell of the operating system provides at least one property sheet page for the object. A property sheet handler is registered in the database. The property sheet handler adds additional property sheet pages for the object. When a request to add at least one property sheet page for the object is received, the property sheet handler is used to add at least one property sheet page for the object.

In accordance with yet another aspect of the present invention, a data processing system includes a memory means, a video display and a processing means. The memory means holds an object and an operating system that includes a shell. The memory means also holds a registry for holding registration information. The registry holds at least one shell extension handler for extending capabilities of the shell of the operating system. The data processing system further includes a processing means for running the operating system and the shell extension handler. The shell extension handler may be a number of different types of handlers, including a context menu handler, an icon handler, a property sheet handler or a shell name space extension handler.

In accordance with another aspect of the present invention, a method is practiced in a data processing system that has a video display and an operating system that includes a file system for performing file system operations on file system objects. In this method, a copy-hook handler is provided to indicate whether a file system operation should be performed on a selected file system object. In response to a request to perform a specified file system operation on the selected file system object, the copy-hook handler is called to generate indication of whether the specified file system operation should be performed on the selected file system object. The indication that is generated by the copy-hook handler is used to determine whether to perform the specified file system operation on the selected file system object.

In accordance with a further aspect of the present invention, a video display displays a representation of a source object and a representation of a target object for a drag-and-drop operation. A data object extension handler is provided to customize the source object to determine a format for a data that is to transferred when a drag-and-drop operation is performed on the source object in response to a user using an input device. A drag-and-drop operation is initiated in response to the user using the input device. This drag-and-drop operation drags the representation of the source object to be positioned over the representation of the target object. The data object extension handler is invoked to determine the format for the data that is to be transferred from the source object in the drag-and-drop operation. The representation of the source object is dropped on the representation of the target object in response to the user using the input device to complete the drag-and-drop operation.

In accordance with yet another aspect of the present invention, a drop target extension handler is provided for customizing behavior of a target object when a drop occurs on the target object. The drag-and-drop operation is initiated on the source object in response to a user using an input device. In particular, the representation of the source object is dragged to be positioned over the representation of the target object. When a user drops the representation of the source object on the representation of the target object, the drop target extension handler is invoked to determine the behavior of the target object in response to the drop.

In accordance with an aspect of the present invention, a method is performed on a data processing system that has an operating system and classes of objects. A shell extension handler is provided for one of the classes of objects to extend the functionality of the shell relative to that class of objects. The shell extension handler is independent of the operating system and may be provided, for instance, by an application program. The shell extension handler is invoked to extend the functionality of the shell for an object in the class of objects for which the shell extension handler is provided.

In accordance with an additional aspect of the present invention, a method is practiced in a data processing system that has a video display and an operating system. The operating system includes a name space mechanism for providing a name space of objects, including file system objects. The operating system also includes a name space viewer for viewing objects in the name space on the video display. In this method, a name space extension is provided by an application program to add non-file system objects to the name space. The name space extension is used to add these non-file system objects to the name space and the name space viewer is then used to view at least one of the non-file system objects that have been added by the name space extension.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4 is a flow chart showing the steps that are performed to add dynamic verbs to a context menu in accordance with the preferred embodiment of the present invention;

FIG. 5 is a flow chart showing the steps that are performed to dynamically add verbs to a context menu in accordance with the preferred embodiment of the present invention;

FIG. 7 is a flow chart showing the steps that are performed to add additional property sheet pages for an object;

FIG. 9 is a flow chart illustrating in more detail how property sheets are added for an object in accordance with the preferred embodiment of the present invention;

FIG. 14 is a flow chart illustrating the steps that are performed to use a drop target extension handler in accordance with the preferred embodiment of the present invention;

FIG. 16 is a flow chart showing the steps that are performed to add additional name spaces to the explorer name space in the preferred embodiment of the present invention;

DETAILED DESCRIPTION OF THE PREFERRED EMBODIMENT

Figure 1:
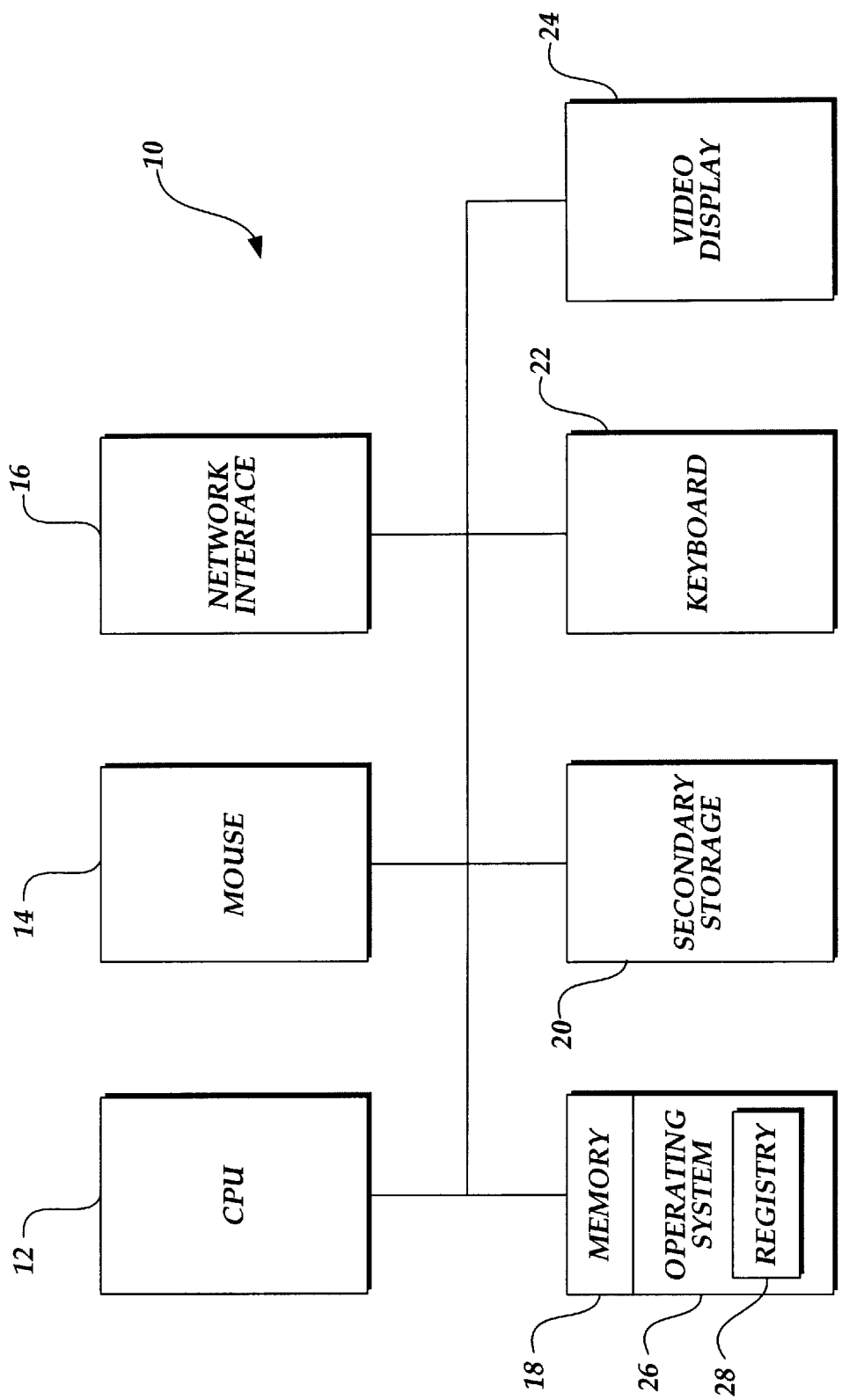
FIG. 1 is a block diagram of a data processing system that is suitable for practicing a preferred embodiment of the present invention.

The preferred embodiment of the present invention extends the capabilities provided by a shell of an operating system to allow an application developer to customize context menus, add property sheet pages for objects and provide per-instance icons for objects. Further, the preferred embodiment of the present invention facilitates the customization of drop behavior and the customization of source objects in drag-and-drop operations on a per-object type basis. A copy-hook handler is provided to enable an application to grant or withhold approval of copy, delete, move or rename commands on objects. In addition, the preferred embodiment of the present invention facilitates the addition of new name spaces to a name space that is visible through a browsing system-provided tool (known as the "explorer"). These shell extensions allow developers to customize to better suit the needs of their users.

The preferred embodiment of the present invention is practiced in an object-oriented environment that supports the "MICROSOFT" OLE 2.01 protocol developed by Microsoft Corporation of Redmond, Washington. In order to fully understand the preferred embodiment of the present invention, it is helpful to review some of the fundamental concepts employed within "MICROSOFT" OLE 2.01.

An "object class" is the definition of both a data structure and functions that manipulate the data structure. An "object" is an instance of an object class. A related "MICROSOFT" OLE 2.01 concept is that of an "interface." An interface is a group of semantically-related functions that are organized into a named unit. The name of the unit is the identifier of the interface. Interfaces have no instantiation in that the interface does not include code for implementing the functions that are identified in the interface; rather, the interface specifies a set of signatures for functions. "Instantiation" refers to the process of creating in-memory structures that represent an object so that the operations can be invoked on the object. When an object "supports" an interface, the object provides code for the function specified by the interface. Hence, an object that supports an interface is responsible for providing the code for implementing the functions of the interface. The code that is provided by the object must comply with the signatures specified by the interface.

The "MICROSOFT" OLE 2.01 protocol also provides "monikers". A moniker is a composite name for an object that includes a pointer to the object. More formally, a moniker is an object that supports the predefined IMoniker interface. The IMoniker interface includes a function for binding the moniker to the object to which the pointer of the moniker points. Binding causes an object to be placed in a running state so that the services supplied by the object may be invoked.

The shell extensions are implemented as shell extension dynamic link libraries (DLLs). The shell extension DLLs are implemented by applications and constitute instances of interfaces. These shell extension DLLs are called when needed to extend the functionality of the shell as required by the application. The preferred embodiment of the present invention provides context menu handlers, icon handlers, property sheet handlers, copy-hook handlers, name space extension handlers, data object extension handlers, and drop target extension handlers. Each of these handlers will be described in more detail below.

FIG. 1 is a block diagram of a computer system 10 that is suitable for practicing the preferred embodiment of the present invention. The computer system 10 includes a central processing unit (CPU) 12 that is connected to a number of input/output devices, including mouse 14, keyboard 22 and video display 24. The computer system 10 also includes a network interface 16 for interfacing the computer system 10 with a network. Memory 18 and secondary storage 20 store data and code. The memory 18 holds a copy of an operating system 26 that includes a registry 28 for holding configuration information.

The registry 28 is organized as a hierarchically structured tree and is roughly analogous to the registry provided by the "MICROSOFT" WINDOWS NT operating system. Each node of the tree is identified by a key name composed of ASCII characters. Keys may contain other keys, known as subkeys. The registry has a predefined root key called HKEY_CLASSES_ROOT. At the same level of the hierarchy are three predefined keys: HKEY_LOCAL_MACHINE, HKEY_CURRENT_CONFIG and HKEY_USER. Each of these predefined keys acts as a root of a separate subtree in the registry. The subtree associated with HKEY_LOCAL_MACHINE holds non-user specific information about the computer system. The HKEY_CURRENT_CONFIG key serves as the root of a subtree that holds non-user specific configuration information that pertains to hardware. Lastly, the HKEY_USER key is at the root of a subtree that holds user specific configuration information. The registry 28 is used by numerous applications, such as will be described below.

Figure 2:
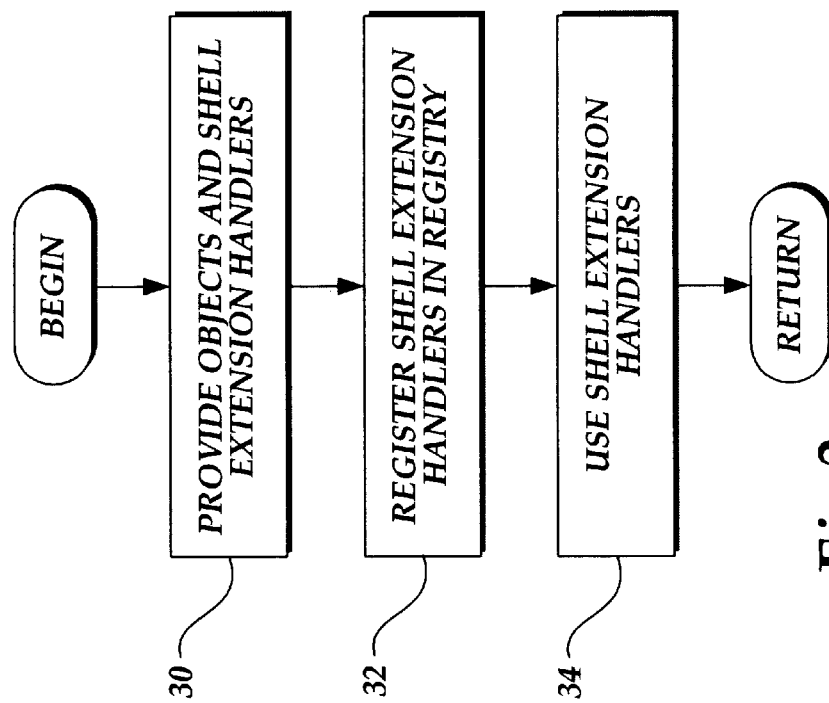
FIG. 2 is a flow chart that provides an overview of the steps that are performed to extend the functionality of an operating system shell in accordance with the preferred embodiment of the present invention.

FIG. 2 is a flowchart that provides an overview of the steps that are performed to facilitate the shell extensions within the preferred embodiment of the present invention. Initially, objects on which the shell extensions operate and shell extension handlers must be provided within the memory 18 of the computer system 10. The shell extension handlers are then registered within the registry 28 (step 32) so that the computer system 10 is aware of the extension handlers and may utilize them. These shell extension handlers are then used to provide the desired shell extensions (step 34). The shell extensions extend the functionality provided by the operating system to aid developers of applications.

The features of the shell extensions may be implemented by performing the steps shown in FIG. 2. In step 32, the shell extension handlers must be registered in the registry 28. Set forth below is an example of the format of the registry 28 for a word processor application to support these features.

```
 1:  .doc = AWordProcessor
 2:  AWordProcessor = A Word Processor
 3:     shell = open print preview
 4:        open
 5:           command = c:\aword\aword.exe %1
 6:        print
 7:           command = c:\aword\aword.exe /p %1
 8:        printTo
 9:           command = c:\aword\aword.exe /pt %1%2%3
10:        preview = Pre&view
11:           command = c:\aword\aword.exe /r %1
12:     shellex
13:        ContextMenuHandlers = ExtraMenu
14:           ExtraMenu = {00000000-1111-2222-3333-00000000000001}
15:        PropertySheetHandlers = SummaryInfo
16:           SummaryInfo = {00000000-1111-2222-3333-
              00000000000002}
17:        IconHandler = {00000000-1111-2222-3333-00000000000003}
18:  DefaultIcon = %1
```

This example portion of the registry will be discussed in more detail below when focusing on the particular types of extensions.

The preferred embodiment allows a developer to customize context menus for objects by specifying customized static verbs and dynamic verbs. A "verb" is a kind of action that is defined by an object and its associated server. In the context menus, a verb is an action that is performed in response to the selection of an associated menu item. For example, the menu item "Open" has an associated verb that opens the file or object. Verbs are supported by the "MICROSOFT" OLE 2.01 protocol. Static verbs are those verbs that are registered under the "shell" key (note line 3 in the above example) within the registry 28. Static verbs may be contrasted with dynamic verbs, which are discussed in more detail below. In the above example, static verbs for the "Open", "Print", "PrintTo" and "Preview" menu items are registered in the registry 28. In particular, note lines 3–11 in the above example.

Figure 3:
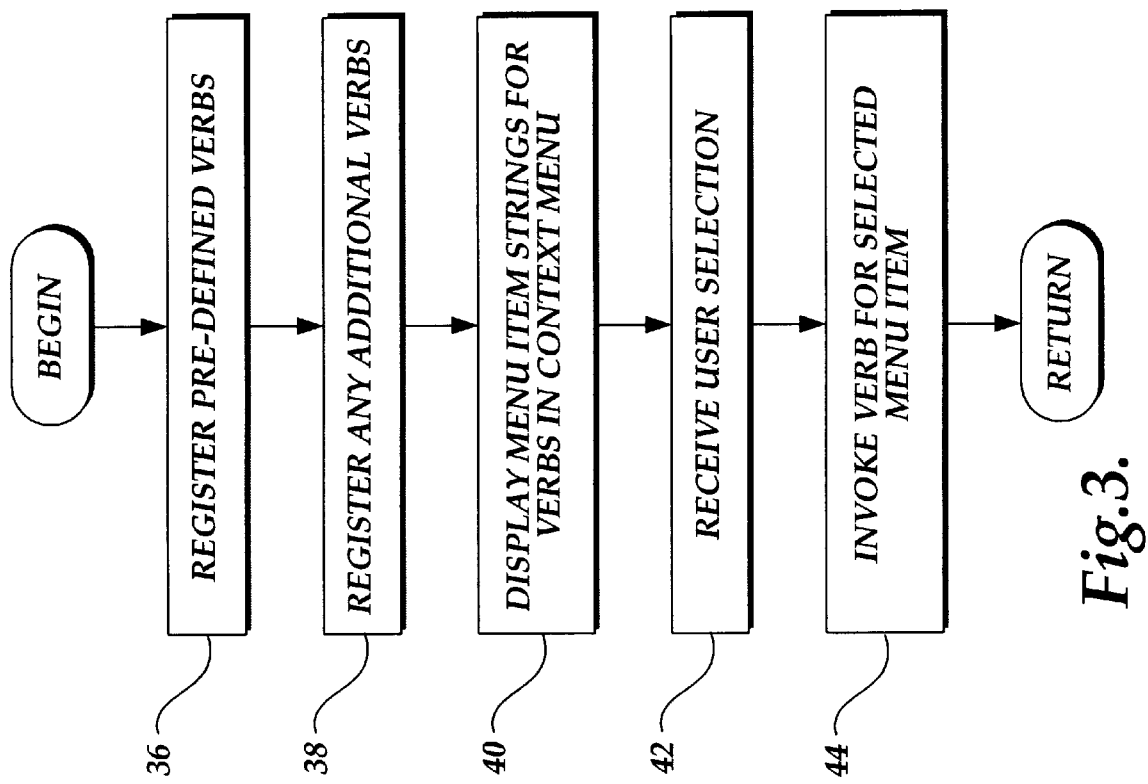
FIG. 3 is a flow chart of the steps that are performed to add verbs to a context menu in accordance with the preferred embodiment of the present invention.

An application implements a context menu handler interface IContextMenu to add more items to a context menu for a file object. The added items may be object class specific or instance specific. FIG. 3 is a flowchart of the steps that are performed to add static verbs to context menus of an object in the preferred embodiment of the present invention. First, any predefined verbs (i.e., those that the shell supports) and additional verbs provided by a developer are registered within the registry 28 (steps 36 and 38 in FIG. 3). The operating system 26 provides functions that may be called to add entries within the registry 28. In the preferred embodiment described herein, these functions are utilized by developers to create entries in the registry 28 like those shown in lines 4–11 of the above example. These verbs are registered in the shell section of the registry and are added to context menus of the specified object type (e.g., word processing documents). The registration of the verb specifies their menu item strings. Once the verbs are registered and the context menu has been activated, menu item strings associated with the verbs are displayed in the context menu (step 40). For the above example, entries for "Open," "Print," "PrintTo" and "Preview" are all displayed as menu item strings in the context menu. A user then selects one of the menu items (step 42), and the verb for the selected menu item is activated (step 44). Path names are provided within the registry 28 for the verbs and are used to invoke the verbs in step 44 by calling the InvokeCommandO function of the IContextMenu interface (which is described in more detail below). Examples of such path names are set forth at lines 5, 7, 9 and 11 in the above example.

As discussed above, an application may also register dynamic verbs. Unlike static verbs, dynamic verbs are not statically assigned to context menus. FIG. 4 is a flowchart of the steps that are performed to utilize dynamic verbs in the preferred embodiment of the present invention. The process is initiated by registering a context menu handler (step 46). An object class definition for the context menu object handler class must also be provided. In the example given above, lines 13 and 14 set forth the entries for registering the context menu handler. In particular, the class ID for the context menu handler class of objects is registered under the shellex key so that the shell knows what type of object to create when a context menu handler is needed. Instance specific context menus require a context menu handler. The context menu handler class ID is passed to a class factory, as defined within Microsoft OLE 2.01, to create an object of that class. A class factory is an object in 'MICROSOFT' OLE 2.01 that supports the IClassFactory interface and is used to create instances of an object class in memory. The IClassFactory interface includes a function, CreateInstance( ) for creating such instances of objects classes in memory. Each context menu handler object is a DLL that allows developers to dynamically add verbs for a context menu. After the context menu handler has been registered, it is used to dynamically add verbs (step 48). This step will be described in more detail below. After the verbs have been added, the context menu is displayed with the menu items for all of the verbs, including those that have been added (step 50). A user then makes a selection that is received by the system (step 52), and the verb associated with the selected menu item is invoked by calling the InvokeCommand( ) function (step 54).

FIG. 5 is a flowchart illustrating the steps that are performed to dynamically add a verb (step 48 in FIG. 4). A user initiates the process of adding verbs to a context menu by clicking a representation of an object with the left button of mouse 14. A message is received that indicates that the user has clicked on the object representation with the left mouse button (step 56). The class ID of the context menu handler is obtained (step 58). The class ID of the context menu handler is contained within the registry 28. The class ID in the example given above is contained in brackets on line 14. An instance of the context menu handler is created (i.e., an object of the specified object class is created) and the pointer for the IShellExtInit interface is requested (step 60). The "MICROSOFT" OLE 2.01 protocol provides interfaces for creating objects of given object classes. These functions are utilized to create an instance of a context menu handler. The IShellExtInit interface is used by the explorer to initialize shell extension objects, like the context menu handler. This interface is defined as follows.

```
undef INTERFACE
#define INTERFACE *IShellExtInit
DECLARE_INTERFACE_(IShellExtInit, Iunknown)
{
    // *** IUnknown methods ***
    STDMETHOD(QueryInterface) (THIS_ REFRIID riid, LPVOID*ppvObj)
      PURE;
    STDMETHOD_ (ULONG, AddRef) (THIS) PURE;
    STDMETHOD_(ULONG, Release) (THIS) PURE;
    // *** IShellExtInit methods ***
STDMETHOD(Initialize) (THIS_LPCITEMIDLIST pidlFolder, LPDDATAOBJECT
    lpdobj, HKEY hkeyProgID) PURE;
};
typedef IShellExtInit * LPSHELLEXTINIT;
```

IUnknown is an interface that all objects must support by definition to comply with "MICROSOFT" OLE 2.01. Several methods from that interface are incorporated into the IShellExtInit interface. Amongst the functions added by this interface is the Initialize( ) function. The Initialize( ) function is then called to initialize the context menu handler object (step 62 in FIG. 5). A pointer to the IContextMenu interface instance provided by the context menu handler object is obtained (step 64). The IContextMenu interface is defined as follows.

```
DECLARE_INTERFACE_ (IcontextMenu, Iunknown)
{
    // *** IUnknown method ***
    STDMETHOD(QueryInterface) (THIS_ REFIID riid, LPVOID*ppvObj)
      PURE; STDMETHOD_(ULONG, AddRef) (THIS) PURE;
    STDMETHOD_(ULONG, Release) (THIS) PURE;
    STDMETHOD(QueryContextMenu) (THIS_
        HMENU    hmenu,
        UINT     indexMenu,
        UINT     idCmdFirst,
        UINT     idCmdLast,
```

```
            UINT    uFlags) PURE;
        STDMETHOD(InvokeCommand) (THIS_
            LPCMINVOKECOMMANDINFO lpici) PURE;
        STDMETHOD(GetCommandString) (This_
            UINT    idCmd,
            UINT    uFlags,
            UINT    *pwReserved,
            LPSTR   pszName,
            UINT    cchMax) PURE;
};
```

Specifically, a QueryInterface( ) function call is made on the context menu handler object to obtain a pointer to the instance of the IContextMenu interface provided by the context menu handler object. The IContextMenu interface includes three functions that are of interest: the QueryContextMenu( ) function, the InvokeCommand( ) function, and the GetCommandString( ) function. The QueryContextMenu( ) function allows the insertion of one or more menu items to a specified menu at a specified location. Parameters identify the menu items, the menu, and the location. The InvokeCommand( ) function is used to invoke a given command when the user selects the command, and the GetCommandString( ) function is used to get the command name or help text for a specified command.

The QueryContextMenu( ) function is then called to add menu items to the identified context menu (step 66). These menu items and their associated verbs may then be used.

Figure 6:
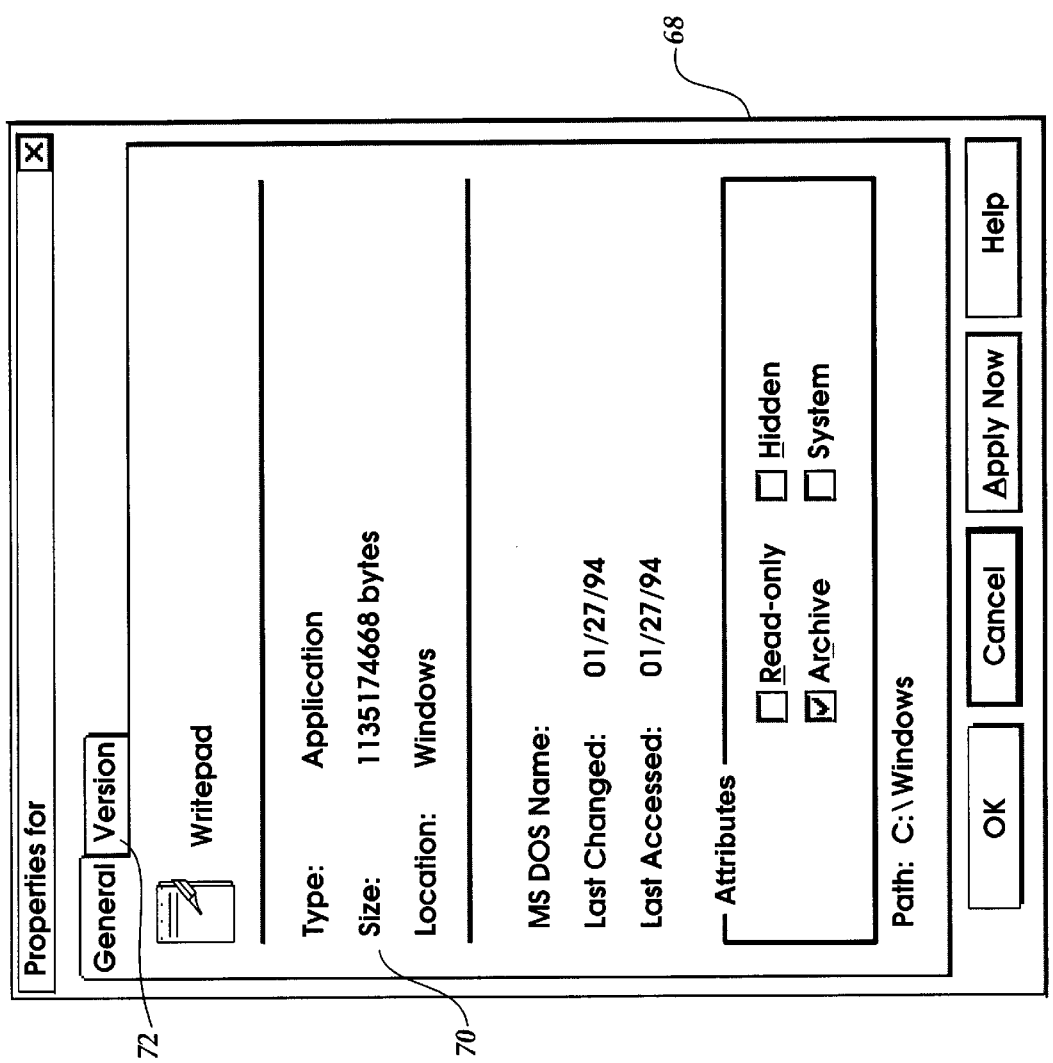
FIG. 6 depicts illustrative property sheets for an object.

The preferred embodiment of the present invention also facilitates the extension of the shell of the operating system 26 by allowing an application to add property sheet pages. This capability is provided in large part by registering a property sheet handler for each property sheet page to be added. FIG. 6 shows an example of a window 68 for displaying two property sheets, 70 and 72. The full body of the "General" property sheet 70 is visible in FIG. 6, whereas only a tab for the "Version" property sheet 70 is visible. In the example shown in FIG. 6, the property sheets are associated with a file, denoted as "WordPad". The property sheets list the names of properties of the file and the current values of the properties. The preferred embodiment of the present invention allows the addition of property sheets for objects such as the "WordPad" file. Thus, developers can create new property sheets that supplement those supported by the shell. For example, suppose that the "WordPad" object is provided by the operating system and typically only has the "General." property sheet page 70 associated with it.

The preferred embodiment of the present invention allows the addition of the "Version" property sheet page by a shell extension.

Figure 8:
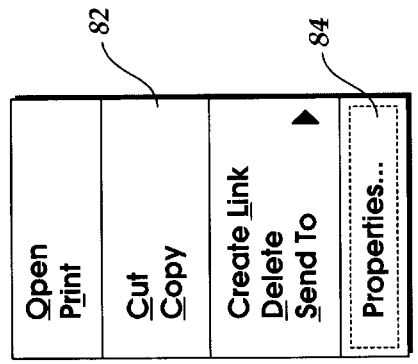
FIG. 8 is an example of a menu that has a command for adding property sheets in accordance with the preferred embodiment of the present invention.

FIG. 7 is a flowchart of the steps that are performed to allow the addition of property sheet pages. A property sheet handler for adding property sheet pages is registered within the registry 28 (step 74 in FIG. 7). An example of such a registration is provided at lines 15 and 16 in the above example. Later when the appropriate user actions (such as clicking the right mouse button) are performed, a context menu with a "Properties . . ." command is displayed on the video display 24 (step 76). FIG. 8 shows an example of such a context menu 82 with a menu item 84 for "Properties . . ." The user then selects the "Properties . . ." menu item (step 78), and the property sheet handler is invoked to add property sheet pages (step 80).

FIG. 9 is a flowchart showing in more detail the steps that are performed to add property sheet pages using the property sheet handler (see step 80 in FIG. 7). A class ID for the property sheet handler is obtained by accessing the registry 28, where the registration information for the property sheet handler is held (step 86). This retrieved class ID is then used in creating an instance of the property sheet handler and obtaining a pointer to the IShellExtInit interface (step 88). As was discussed above, this interface includes the Initialize( ) function. The Initialize( ) function is called to initialize the property sheet handler object that has been newly created (step 90). An interface pointer to the IShellPropSheetExt interface is obtained by calling the QueryInterface( ) function (step 92 in FIG. 9). The IShellPropSheetExt interface is defined as follows.

```
undef INTERFACE
#define INTERFACE IShellPropSheetExt
DECLARE_INTERFACE_(IShellPropSheetExt, IUnknown)
{
    // *** IUnknown methods ***
        STDMETHOD(QueryInterface) (THIS_REFIID riid, LPVOID*ppvObj)
            PURE;
        STDMETHOD_(ULONG, AddRef) (THIS) PURE;
        STDMETHOD_(ULONG, Release) (THIS) PURE;
    // *** IShellPropSheetExt methods ***
        STDMETHOD(AddPages) (THIS_LPFNADDPROPSHEETPAGE    lpfnAddPage,
            LPARAM lparam) PURE;
            STDMETHOD(ReplacePage) (THIS UINT uPageID,
                LPFNADDPROPSHEETPAGE lpfnReplaceWith, LPARAM
                lpParam) PURE;
}
```

The IShellPropSheetExt interface is used to allow property sheet extensions for adding additional property sheet pages. This interface includes the AddPages( ) function, which adds property sheet pages for an object. The AddPages( ) function is then called to add the property sheet pages (step 94). For each property sheet page that is added, a page object is created by calling a CreatePropertySheetPage( ) function, which is provided in the operating system 26 as part of the application program interfaces (API's) that are available.

Figure 10:
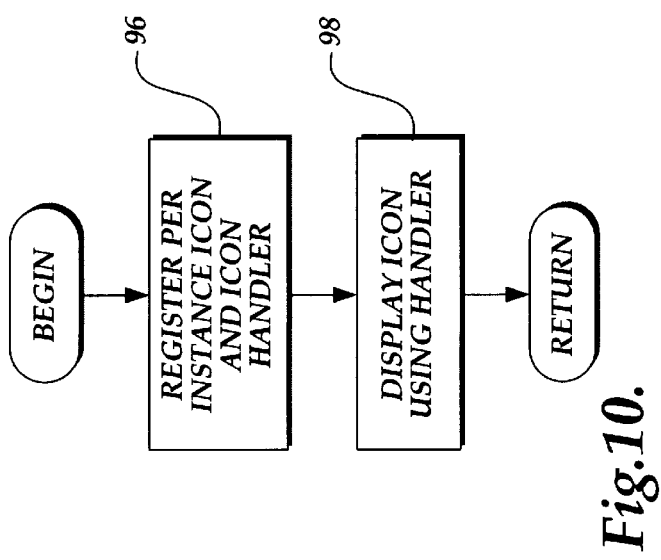
FIG. 10 is a flow chart showing the steps that are performed to use perinstance icons for an instance of an object in accordance with the preferred embodiment of the present invention.

FIG. 10 is a flowchart that shows the steps that are performed to facilitate per-instance icons for objects. Representations of the per-instance icons, such as metafiles or bitmaps, are registered within the registry 28, along with an icon handler object (step 96 in FIG. 10). In the example given above, the class ID for the icon handler is registered at line 17. When the shell of the operating system 26 needs to display a representation of the object associated with the icon, it calls the icon handler to display the per-instance icon (step 98).

Figure 11:
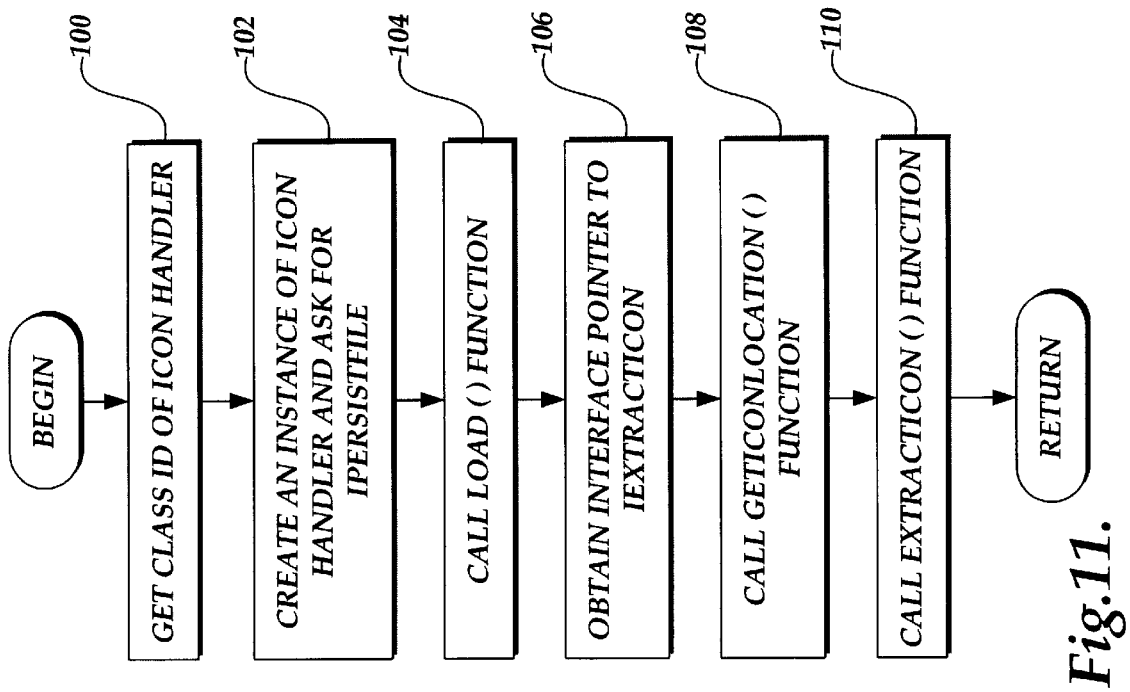
FIG. 11 is a flow chart showing in more detail the steps that are performed to register a per-instance icon handler in the preferred embodiment of the present invention.

FIG. 11 shows the steps performed to display the icon using the icon handler in more detail (see step 98 in FIG. 10). Initially, a class ID for the icon handler is obtained by accessing the registry 28 (step 100). An instance of the icon handler is created and a pointer for the IPersistFile interface instance provided by the icon handler object is obtained (step 102). Using the pointer for the IPersistFile interface (defined within Microsoft OLE 2.01) of the icon handler object that is provided, the shell calls the Load function to initialize the icon handler object (step 104).

An interface pointer for the IExtractIcon interface provided by the icon handler is obtained by calling the QueryInterface( ) function. The IExtractIcon interface is defined as follows.

to obtain a location of the file that holds a representation of the icon (step 108). The ExtractIcon( ) function is called to extract the icon representation out of the file and use the extracted representation to display the icon with the shell (step 110).

Another type of shell extension handler that may be registered in the preferred embodiment of the present invention is a copy-hook handler. An application registers to copy-hook handler so that the shell of the operating system 26 calls the copy-hook handler before the shell moves, copies, deletes, or renames a folder or printer object. The copy-hook handler does not perform the operation itself but rather provides approval for the requested operation. When the shell receives approval from the copy-hook handler, it performs the requested file system operation.

Figure 12:
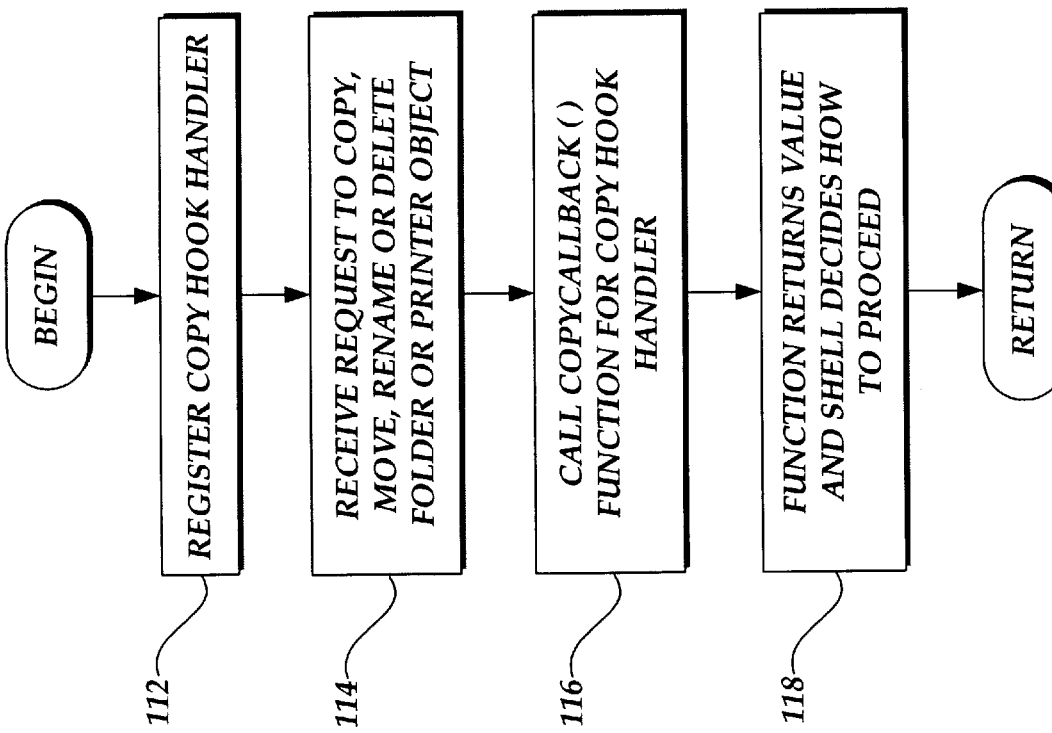
FIG. 12 is a flow chart illustrating the steps that are performed to use a copy hook handler in accordance with the preferred embodiment of the present invention.

FIG. 12 is a flow chart of the steps that are performed to utilize a copy-hook handler in accordance with the preferred embodiment of the present invention. Initially the copy-hook handler is registered within the registry 28 (step 112 in FIG. 12). The shell directly initializes the copy-hook handler rather than calling the IShellExtInit or IPersistFile interfaces. A copy-hook handler supports the ICopyHook interface, which is defined as follows:

```
DECLARE_INTERFACE_(IExtractIcon, IUnknown)
{
    // *** IUnknown methods ***
    STDMETHOD(QueryInterface) (THIS_ REFIID riid, LPVOID * ppvObj)
      PURE;
    STDMETHOD_(ULONG, AddRef) (THIS) PURE;
    STDMETHOD_(ULONG, Release) (THIS) PURE;
    // *** IExtractionIcon methods ***
    STDMETHOD(GetIconLocation) (THIS_
        UINT      uFlags
        LPSTR     szIconFile,
        UINT      cchMax,
        int       * piIndex,
        UINT      * pwFlags) PURE;
    STDMETHOD(ExtractionIcon) (THIS_
        LPCSTR    pszFile,
        UINT      nIconIndex,
        HICON     *phiconLarge,
        HICON     *phiconSmall,
        UINT      nIconSize) PURE;
};
typedef IExtractIcon*      LPEXTRACTICON;
```

The GetIconLocation( ) function returns an icon location, and the ExtractIcon function extracts an icon image from a specified file. The GetIconLocation( ) function is then called

```
DECLARE_INTERFACE_(ICopyHook, IUknown) // sl
{
    // *** IUnknown methods ***
    STDMETHOD(QueryInterface) (THIS_REFIID riid, LPVOID *ppvObj)
      PURE;
    STDMETHOD_(ULONG, AddRef) (THIS) PURE;
    STDMETHOD_(ULONG, Release) (THIS) PURE;
    STDMETHOD_(UNIT, CopyCallback) (THIS_HWND hwnd, UINT wFunc,
        UINT wFlags, LPCSTR pszSrcFile, DWORD dwSrcAttribs,
            LPCSTR pszDestFile, DWORD dwDestAttribs) PURE;
};
typedef ICopyHook *     LPCOPYHOOK;
```

The ICopyHook interface includes a CopyCallBack( ) function that is called and returns an integer value that indicates whether the shell should perform the requested file system operation. The method may return an integer value that encodes a "YES" response that specifies that the operation should be carried out, an integer value that encodes a "NO" response that specifies that the operation should not be performed or an integer value that encodes a "CANCEL" response that specifies that the whole operation should be canceled. For example, where a batch of files is being copied, "CANCEL" cancels the entire operation for all files on the list, whereas "NO". skips a file on the list that is being copied.

Returning to FIG. 12, the shell receives a request to copy, move, rename or delete a folder or printer object (step 114). The shell then calls the CopyCallBack( ) function for the copy-hook handler (step 116). The function returns an integer value and the shell determines, based upon the integer value, whether to perform the operation or not (step 118).

The preferred embodiment of the present invention also provides two varieties of shell extensions that concern drag-and-drop operations. The first variety is the data object extension which allows the customization of a source object during a drag-and-drop operation. The "MICROSOFT" OLE 2.01 protocol provides a uniform data transfer mechanism that is described in copending United States Application, "Uniform Data Transfer," Ser. No. 08/199,853, filed on Feb. 22, 1994. The uniform data transfer mechanism allows the specification of a data format in which a data transfer operation is to be performed. The uniform data transfer mechanism is used during drag-and-drop operation in the preferred embodiment of the present invention. The data object extension handler allows data to be transferred in a format that is different from the data format of the source object. Thus, for example, a portion of text in a document may be dragged out of the document as a scrap and dropped in a file by using a data object extension handler that specifies that the data is to be transferred as an OLE embedding rather than a file. As a result, the scrap is dropped as an embedding.

Figure 13:
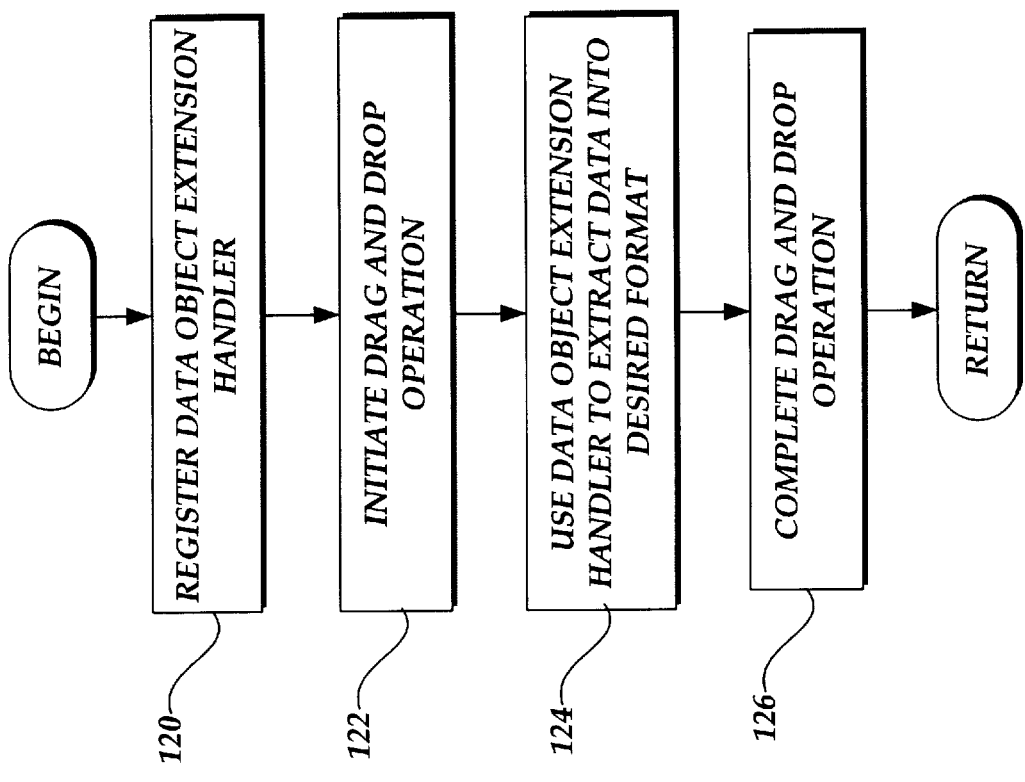
FIG. 13 is a flow chart illustrating the steps that are performed to utilize a data object extension handler in accordance with the preferred embodiment of the present invention.

FIG. 13 is a flow chart illustrating the steps that are performed to utilize the data object extension handlers in the preferred embodiment of the present invention. Initially, the data object extension handler must be registered with the registry 28 (step 120 in FIG. 13). Data object extension handlers are registered on a per-object class basis such that multiple objects of a given class may use the same data object extension handler. A drag-and-drop operation is then initiated using the mouse 14 (step 122). As part of the drag-and-drop operation, the data object extension handler is called by the shell to extract data from the source object into the desired format (step 124). The drag-and-drop operation is then completed with the data being transferred in the appropriate data format (step 126).

The preferred embodiment of the present invention additionally provides drop target extensions. Drop target extension handlers may be registered on a per-object class basis to customize the functionality of drop targets. The "MICROSOFT" OLE 2.01 protocol provides facilities for objects to register as drop targets so that they may receive drops in drag-and-drop operations. The drop target extension handlers customize the behavior of drop targets.

FIG. 14 shows the steps that are performed to use a drop target extension handler in the preferred embodiment of the present invention. Initially a drop extension handler is registered on a per-object class basis with the registry 28 (step 128 in FIG. 14). A drag-and-drop operation is initiated using the mouse 14 (step 130 in FIG. 14). When the object is dropped, the shell calls the drop target extension handler to determine whether the drop should be accepted and, if accepted, to determine what steps should be performed (step 132).

An example helps to illuminate the functionality that is provided by the drop target extension handlers. Suppose that a drop target is an executable file (i.e., an EXE file). In such a case, when an object is dragged and dropped on the executable file, the drop target extension handler is run. The drop target extension handler causes the executable file to run using the dropped object. For example, suppose that a document is dropped on a word processing program executable file. In such a case, the dropped target extension handler causes the word processing program to be run to edit the document that was dropped.

It should be appreciated that the above-described extensions apply not only to file system objects but also to network objects that may be browsed using the shell explorer. The appropriate handlers may be registered in the registry 28 under a particular network provider or under the "Network" class.

Figure 15:
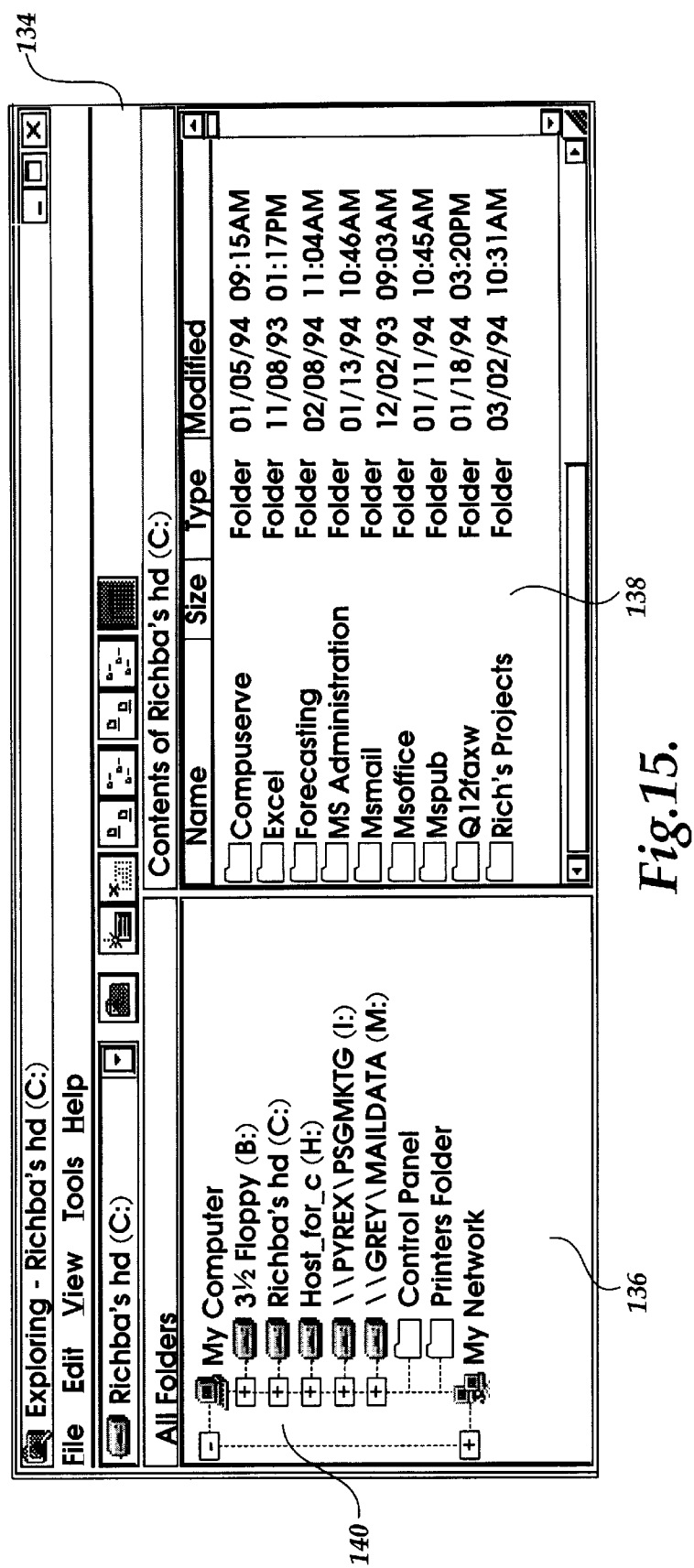
FIG. 15 is an example of an explorer window used in the preferred embodiment of the present invention.

An additional extension provided by the shell of the operating system 26 is the ability to add additional name spaces that are visible to the explorer. For example, a mail folder holding mail messages may be plugged into the explorer name space. Thus, vendors may create new name spaces and simply plug the new name spaces into the explorer name space. This ability to add new name spaces is not limited to particular object types. A developer may manipulate and view objects that are visible in the explorer name space. The explorer name space is a hierarchical name space that, in the preferred embodiment, includes file system objects, control panel items, printer objects and network objects. FIG. 15 depicts an example of a user interface that is provided for the explorer. The explorer is a part of the operating system 26 that allows the user to browse the explorer name space. The user interface 134 for the explorer includes a first portion 136 that depicts the various folders in the hierarchy of the explorer name space. The second portion 138 shows the folder contained within a particular folder that is selected from amongst those in the first portion 136. The selected folders may include sub-folders or simply its own contents. For example, in FIG. 15, the second portion 138 shows in more detail the contents of folder 140.

In order to incorporate a name space into the explorer name space, a developer needs to provide explorer extension handlers. The handlers are folders that are integrated into the explorer name space. These handlers act as in process server DLLs as defined within the "MICROSOFT" OLE 2.01 protocol. The explorer extension handlers must be registered within the registry 28. FIG. 16 provides a flowchart of the steps that are performed to facilitate the integration of such additional name spaces into the explorer name space. First, the explorer extension handler must be registered within the registry 28 (step 142 in FIG. 16). The explorer extension handlers may be registered under the "My Computer" directory within the explorer name space or under other file system directories. To put an extension under the "My Computer" directory, the class ID of the explorer extension handler should be registered under "HKEY_MACHINE\Software\Windows\CurrentVersion\Explorer". When, instead, the class ID of the explorer extension handler is to be registered in a file system directory, a special file system directory should be created.

Figure 17:
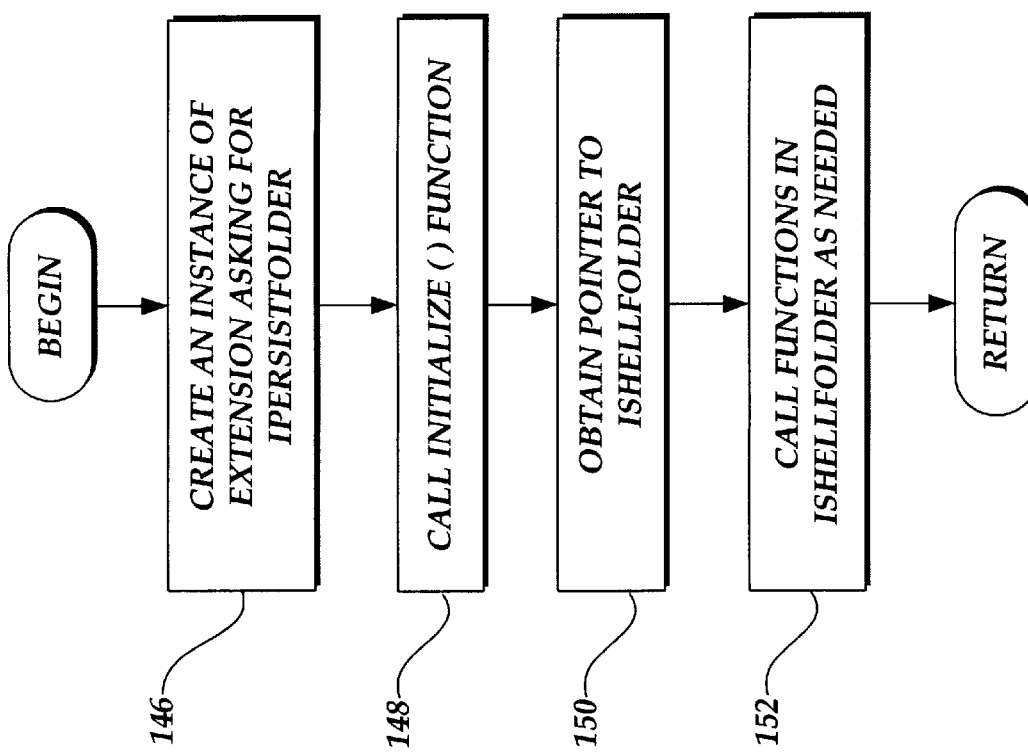
FIG. 17 is a flow chart of the steps that are performed to add a shell folder object to the explorer name space.

The explorer extension handler is then called to display and gain access to the extended name space of the handler (step 144 in FIG. 16). FIG. 17 shows in more detail the steps that are performed to realize the displaying and accessing of the extended name space. An instance of the explorer extension handler is created and an interface pointer to the instance of the IPersistFolder that the handler provides is obtained (step 246 in FIG. 17). The IPersistFolder interface is defined as follows.

```
undef INTERFACE
#define INTERFACE IPersistFolder
DECLARE_INTERFACE_(IPersistFolder, IPersist) // fld
{
    // *** IUnknown methods ***
    STDMETHOD(QueryInterface( (THIS_ REFIID riid, LPVOID * ppvObj)
      PURE;
    STDMETHOD_(ULONG, AddRef) (THIS) PURE;
    STDMETHOD_(ULONG, Release) (THIS) PURE;
    // *** IPersist methods ***
    STDMETHOD(GetClassID) (THIS_LPCLSID lpClassID) PURE;
    // *** IPersistFolder methods ***
    STDMETHOD(Initialize) (THIS_LPCITEMIDLIST pidl) PURE;
};
```

The IPersistFolder interface includes the Initialize( ) function for initializing a shell folder object. In this case, the new name space is a shell folder object. The Initialize( ) function is then called (step 148). A pointer to the IShellFolder interface is obtained by calling the QueryInterface( ) function (step 150 in FIG. 17). The IShellFolder interface includes a number of functions that allow the explorer to view the objects within the added name space and to manipulate the objects contained therein. In particular, the IShellFolder interface is defined as follows.

These functions are called as needed to perform the needed behavior to view and manipulate the objects of the added name space (step 152 in FIG. 17). Of particular interest to the preferred embodiment of the present invention is the CreateViewObject( ) function that creates a view object that supports the IShellView interface. Also of interest in the IShellFolder interface is the GetUIObjectOf( ) function that creates a UI object (e.g., an icon) to be used for specified objects. The EnumObjects( ) function is used to enumerate the objects within the new object space.

```
DECLARE_INTERFACE_(IShellFolder, IUnknown)
{
    // *** IUnknown methods ***
    STDMETHOD (QueryInterface) (THIS_REFIID riid, LPVOID * ppvObj)
      PURE;
    STDMETHOD (ULONG, AddRef) (THIS) PURE;
    STDMETHOD_(ULONG, Release) (THIS) PURE;
    // *** IShellFolder methods ***
    STDMETHOD(ParseDisplayName) (THIS_HWND hwndOwner, LPBC
      pbcReserved, LPOLESTR lpszDisplayName,
        ULONG*   pchEaten,   LPITEMIDLIST   *   ppidl,   ULONG
          *pdwAttributes) PURE;
    STDMETHOD(EnumObjects) (THIS_HWND hwndOwner, DWORD grfFlags,
      LPENUMIDLIST * ppenumIDList) PURE;
    STDMETHOD(BindToObject) (THIS_LPCITEMIDLIST pidl, LPBC
      pbcReserved, REFIID riid, LPVOID * ppvOut) PURE;
    STDMETHOD(BindToStorage) (THIS_LPCITEMIDLIST pidl, LPBC
      pbcReserved, REFIID riid, LPVOID * ppvObj) PURE;
    STDMETHOD(CompareIDs) (THIS_LPARAM lParam, LPCITEMIDLIST
      pidl1, LPCITEMIDLIST pidl2) PURE;
    STDMETHOD(CreateViewObject) (THIS_HWND hwndOwner, REFIID riid,
      LPVOID * ppvOut) PURE;
    STDMETHOD(GetAttributesOf) (THIS_UINT cidl, LPCITEMIDLIST *
      apidl, ULONG * rgflnOut) PURE;
    STDMETHOD(GetUIObjectOf) (THIS_HWND hwndOwner, UINT cidl,
        LPCITEMIDLIST * apidl, REFIID riid, UINT * prgflnOut LPVOID
          * ppvOut) PURE;
    STDMETHOD(GetDisplayNameOf) (This_LPCITEMIDLIST pidl, DWORD
      uFlags, LPSTRRET lpName) PURE;
    STDMETHOD(SetNameOf)   (This_HWND hwnd([O?]wner,
      LPCITEMIDLIST pidl, LPCOLESTR lpszName, DWORD uFlags,
      LPITEMMIDLIST * pidlOut) PURE;
};
```

The IShellView interface is defined as follows:

```
DECLARE_INTERFACE_(IShellView, IOleWindow)
{
    // *** IUnknown methods ***
    STDMETHOD (QueryInterface) (THIS_ REFIID riid, LPVOID FAR*
        ppvObj) PURE;
    STDMETHOD_(ULONG, AddRef) (THIS) PURE;
    STDMETHOD_(ULONG, Release) (THIS) PURE;
    // *** IOleWindow methods ***
    STDMETHOD(GetWindow) (THIS_ HWND FAR* lphwnd) PURE;
    STDMETHOD(ContextSensitiveHelp) (THIS_ BOOL fEnterMode) PURE;
    // *** IShellView methods ***
    STDMETHOD(TranslateAccelerator) (THIS_LPMSG lpmsg) PURE;
    STDMETHOD(EnableModelss) (THIS_ BOOL fEnable) PURE;
    STDMETHOD(UIActivate) (THIS_ UINT uState) PURE;
    STDMETHOD(Refresh) (THIS) PURE;
    STDMETHOD(CreateViewWindow) (THIS_ IShellView FAR *lpPrevView,
        LPCFOLDERSETTINGS lpfs, IShellBrowser FAR * psb, RECT FAR*
        preView, HWND FAR *phWnd) PURE;
    STDMETHOD(DestroyViewWindow) (THIS) PURE;
    STDMETHOD(GetCurrentInfo) (THIS_ LPFOLDERSETTINGS lpfs) PURE;
    STDMETHOD(ForwardControlMsg) (THIS_ UINT id, UINT uMag, WPARAM
        wParam, LPARAM lParam,
            LRESULT FAR* pret) PURE;
    STDMETHOD(AddPropertySheetPages) (THIS_ DWORD dwReserved,
        LPFNADDPROPSHEETPAGE lpfn, LPARAM lparam) PURE;
    STDMETHOD(SaveViewState) (THIS) PURE;
    STDMETHOD(SelectItem) (THIS_ LPCVOID lpvID, UINT uFlags) PURE;
    };
```

The shell uses the IShellView interface to display information in the second portion 138 (FIG. 15) of the explorer. The explorer calls the CreateViewWindow( ) function to allow a name space extension to create a view window for a folder. The explorer notifies state changes by calling the UIActivate( ) function.

The shell explorer/folder frame window that provides the first portion 136 of the explorer supports the IShellBrowser interface. This interface is defined as follows:

```
DECLARE_INTERFACE_(IShellBrowser, IOleWindow)
{
    // *** IUnknown methods ***
    STDMETHOD (QueryInterface) (THIS_ REFIID riid, LPVOID FAR*
        ppvObj) PURE;
    STDMETHOD_(ULONG, AddRef) (THIS) PURE;
    STDMETHOD_(ULONG, Release) (THIS) PURE;
    // *** IOleWindow methods ***
    STDMETHOD(GetWindow) (THIS_ HWND FAR* lphwnd) PURE;
    STDMETHOD(ContextSensitiveHelp) (THIS_ BOOL fEnterMode) PURE;
    // *** IShellBrowser methods *** (same as IOleInPlaceFrame)
    STDMETHOD(InsertMenus) (THIS_ HMENU hmenuShared,
        LPOLEMENUGROUPWIDTHS lpMenuWidths) PURE;
    STDMETHOD(SetMenu) (THIS_ HMENU hmenuShared, HOLEMENU
        holemenu, HWND hwndActiveObject) PURE;
    STDMETHOD(RemoveMenus) (THIS_ HMENU hmenuShared) PURE;
    STDMETHOD(SetStatusText) (THIS_ LPCOLESTR lpszStatusText)
        PURE;
    STDMETHOD(EnableModeless) (THIS_ BOOL fEnable) PURE;
    STDMETHOD (TranslateAccelerator) (THIS_ LPMSG lpmsg, WORD wID)
        PURE;
    // *** IShellBrowser methods ***
    STDMETHOD(BrowseObject) (THIS_ LPMONIKER pmk, UINT wFlags)
        PURE;
    STDMETHOD(GetViewStateStream) (THIS_ DWORD grfMode, LPSTREAM
        FAR *ppStrm) PURE;
    STDMETHOD(GetControlWindow) (THIS_ UINT id, HWND FAR* lphwnd)
        PURE;
```

```
    STDMETHOD(SendControlMsg) (THIS_ UINT id, UINT uMsg, WPARAM
        wParam, LPARAM lParam, LRESULT FAR* pret) PURE;
    STDMETHOD (OnViewWindowActive) (THIS_ struct IShellView FAR*
        ppshv) PURE;
    STDMETHOD (AddViewPropertySheetPages) (THIS_ DWORD dwReserved,
    LPFNADDPROPSHEETPAGE lpfn, LPARAM lparam) PURE;
    STDMETHOD (SetToolbarItems) (THIS_ LPTBBUTTON lpButtons, UINT
        nButton, UINT uFlags) PURE;
};
```

The shell explorer/folder frame calls its CreateViewObject( ) function to create an object that supports the IShellView interface. The shell explorer/folder frame calls its CreateViewWindow function to create the first portion 136 of the explorer. A pointer to the IShellBrowser interface is passed to the view object that supports the IShellView interface as a parameter to the CreateViewWindow( ) function call.

Thus, in order to add a name space to the explorer name space, the extension handler must support the IPersistFolder and IShellFolder interfaces. In addition, each object in the new name space must support the IShellView interface. The IShell/Explorer folder frame must support the IBrowser interface.

Figure 18:
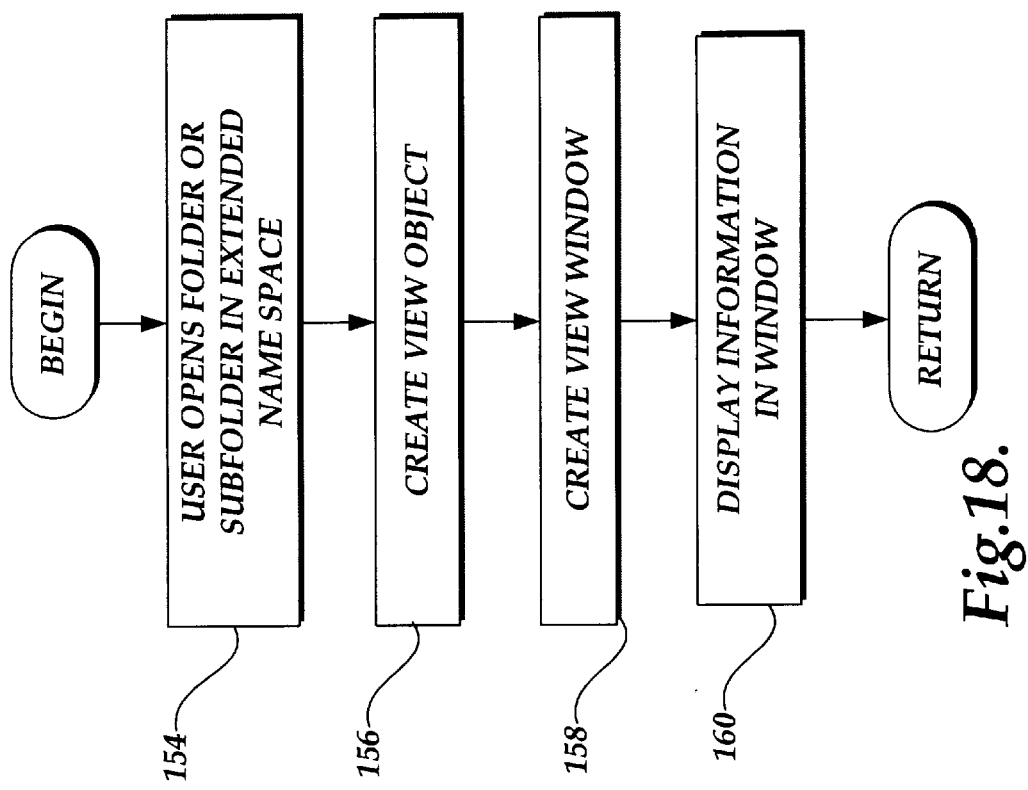
FIG. 18 is a flow chart showing the steps that are performed to display the contents of objects in a newly added name space in the preferred embodiment of the present invention.

FIG. 18 is a flowchart illustrating the steps that are performed when the user opens a shell folder for an extended name space or one of the subfolders contained within the shell folder for the extended name space. Initially, the user opens the folder or subfolder in the extended name space (step 154 in FIG. 18). The folder or subfolder is typically displayed in the first area 136 (FIG. 15) of the explorer window 134 The folder or subfolder is opened by double clicking on the folder or subfolder with the mouse 14 or by selecting an open option from the file menu. A view object is then created by calling the CreateViewObject( ) within the IShellFolder interface (step 156 in FIG. 18). The view object knows how to display the contents of the folder or subfolder. A view window for the folder or subfolder is then created by calling the CreateViewWindow( ) function to create a view window for the folder or subfolder. The view object then displays information in the view window, as dictated by the folder or subfolder. Thus, for example, the contents of the folder or subfolder may he shown in a second portion 138 of the explorer window 134 (FIG. 15).

The approach of the preferred embodiment of the present invention differs greatly from approaches adopted by conventional operating systems. In conventional operating systems, the shell is typically responsible for displaying any information about file system objects within a file manager. In the preferred embodiment of the present invention, in contrast, the objects are responsible for displaying their contents within the explorer. For example, each folder and subfolder within an extended name space is responsible for displaying its contents when opened using the explorer. This allows users to easily discern the contents of such folders and subfolders.

While the present invention has been described with reference to a preferred embodiment thereof, those skilled in the art will appreciate that variations in form and detail may be made without departing from the intended scope of the present invention as defined in the appended claims.

The shell extensions of the preferred embodiment of the present invention are described in more detail in the attached appendix.

The embodiments of the invention in which an exclusive property or privilege is claimed are defined as follows:

1. A method of transferring a computer program product from a first computer to a second computer connected to the first computer through a communications medium, comprising:

(a) accessing, on the first computer, computer-executable instructions which, when run on a data processing system having an operating system with a shell that provides functionality, an application program installed under the operating system, and a class of objects related to the application program, said class of objects having an associated object class identifier, perform the steps of:

(1) providing a shell extension handler for the class of objects to extend the functionality of the shell relative to the class of objects, said shell extension handler provided by the application program when the application program is installed under the operating system and being independent of the operating system; and (2) running the shell extension handler to extend the functionality of the shell for an object in the class of objects when the object class identifier is invoked through the shell; and (b) transferring the computer-executable instructions from the first computer to the second computer through the communications medium.

2. The computer-readable medium of claim 1, wherein the data processing system further comprises a registry, and wherein said computer-executable instructions further comprise registering the shell extension handler in the registry so that the shell is aware of the shell extension handler.

* * * * *

UNITED STATES PATENT AND TRADEMARK OFFICE
CERTIFICATE OF CORRECTION

PATENT NO. : 6,160,550
DATED : December 12, 2000
INVENTOR(S) : S. Nakajima et al.

It is certified that error appears in the above-identified patent and that said Letters Patent is hereby corrected as shown below:

Column 1,
Item [62] Related U.S. Application Data "Division of application No. 09/179,240, Oct. 26, 1998, Pat. No. 5,831,606, which is a continuation of application No. 08/355,410, Dec. 13, 1994, Pat. No. 6,008,806." should read -- Division of application No. 09/179,240, Oct. 26, 1998, Pat. No. 6,008,806, which is a continuation of application No. 08/355,410, Dec. 13, 1994, Pat. No. 5,831,606. --
Lines 6-9, "This application is a divisional of U.S. patent application Ser. No. 09/179,240 filed on Oct. 26, 1998, now U.S. Pat. No. 5,831,606, which is a continuationof
U.S. Ser. No. 08/355,410 filed on Dec. 13, 1994, now U.S. Pat. No. 6,008, 806." should read -- This application is a divisional of U.S. patent application Ser. No. 09/179,240 filed on Oct. 26, 1998, now U.S. Pat. No. 6,008,806, which is a continuation of U.S. patent application Ser. No. 08/355,410 filed on Dec. 13, 1994, now U.S. Pat. No. 5,831,606. --

Column 2,
Line 56, "to generate indication" should read -- to generate an indication --
Line 66, "to transferred" should read -- to be transferred --

Column 4,
Line 10, "perinstance" should read -- per-instance --

Column 7,
Line 9, "InvokeCommandO" should read -- InvokeCommand( ) --
Line 27, "Microsoft" should read -- "MICROSOFT" --
Line 44, " 'MICROSOFT" " should read -- "MICROSOFT" --
Lines 47-48, "CreateInstance(
        )" should read -- CreateInstance( ) --

Column 8,
Line 9, first table, "STDMETHOD (ULONG, Release)" should read -- STDMETHOD_ (ULONG, Release) --
Line 3, second table, "method" should read -- methods --

Column 9,
Line 67, " "General." property" should read -- "General" property --

UNITED STATES PATENT AND TRADEMARK OFFICE
CERTIFICATE OF CORRECTION

PATENT NO. : 6,160,550
DATED : December 12, 2000
INVENTOR(S) : S. Nakajima et al.

It is certified that error appears in the above-identified patent and that said Letters Patent is hereby corrected as shown below:

Column 10,
Line 25, "for "Properties . . . " " should read -- for "Properties ... ". --
Line 11, table "LPFNAADDPROPSHEETPAGE" should read
-- LPFNADDPROPSHEETPAGE --

Column 11,
Line 21, "Microsoft" should read -- "MICROSOFT" --
Line 8, first table, "IExtractionIcon" should read IExtractIcon --
Line 15, first table, "(IExtractionIcon)" should read -- (IExtractIcon) --

Column 12,
Line 1, first table, "DECLARE INTERFACE " should read
-- DECLARE_INTERFACE_ --

Column 13,
Line 12, "whereas "NO".skips" should read -- whereas "NO" skips --
Line 31, "operation" should read -- operations --

Column 14,
Line 39, "selected folders" should read -- selected folder --

Column 15,
Line 20, second table, "pidl1, LPCITEMIDLIST pidl2) PURE;" should read
-- pidl1, LPCITEMIDLIST pidl2) PURE; --
Line 26, second table, "prgfinOut" should read -- prgfInOut --
Line 32, second table, "pidlOut)" should read -- ppidlOut) --

Column 17,
Line 13, first table, "(EnableModelss)" should read -- (EnableModeless) --
Line 18, first table, "preView," should read -- prcView, --
Line 20, first table, "(THIS LPFOLDERSETTINGS" should read
-- (THIS_LPFOLDERSETTINGS --

Column 18,
Line 6, first table, "STDMETHOD (ULONG, AddRef)" should read
-- STDMETHOD_(ULONG, AddRef) --

UNITED STATES PATENT AND TRADEMARK OFFICE
CERTIFICATE OF CORRECTION

PATENT NO. : 6,160,550
DATED : December 12, 2000
INVENTOR(S) : S. Nakajima et al.

It is certified that error appears in the above-identified patent and that said Letters Patent is hereby corrected as shown below:

<u>Column 19,</u>
Line 2, after "PURE;" indent and insert -- STDMETHOD (QueryActiveShellView) (THIS_ struct IShellView FAR** ppshv) PURE; --
Line 25, "Ishell/Explorer" should read -- Shell/Explorer --
Line 34, "window 134 The" should read -- window 134. The --
Line 44, "he" should read -- be --

Signed and Sealed this

Fourth Day of December, 2001

*Attest:*

*Nicholas P. Godici*

*Attesting Officer*

NICHOLAS P. GODICI
*Acting Director of the United States Patent and Trademark Office*